US010049693B2

(12) United States Patent
Hutchinson et al.

(10) Patent No.: US 10,049,693 B2
(45) Date of Patent: Aug. 14, 2018

(54) SUBSTRATE HEAT CHANNELS FOR HEAT ASSISTED MAGNETIC RECORDING FOR READER OVER WRITER TRANSDUCER APPLICATION

(71) Applicant: Seagate Technology LLC, Cupertino, CA (US)

(72) Inventors: Erik J. Hutchinson, Eden Prairie, MN (US); John Wolf, Maple Grove, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/227,319

(22) Filed: Aug. 3, 2016

(65) Prior Publication Data

US 2018/0040344 A1 Feb. 8, 2018

(51) Int. Cl.
*G11B 11/00* (2006.01)
*G11B 5/60* (2006.01)
*G11B 5/48* (2006.01)
*G11B 5/00* (2006.01)
*G11B 7/1387* (2012.01)

(52) U.S. Cl.
CPC .......... *G11B 5/6082* (2013.01); *G11B 5/4866* (2013.01); *G11B 5/6088* (2013.01); *G11B 7/1387* (2013.01); *G11B 2005/0021* (2013.01)

(58) Field of Classification Search
None
See application file for complete search history.

(56) References Cited

U.S. PATENT DOCUMENTS

| 6,452,740 | B1 | 9/2002 | Ghoshal |
| 6,950,280 | B2 | 9/2005 | Rea et al. |
| 7,102,853 | B2 | 9/2006 | Macken et al. |
| 7,391,590 | B2 | 6/2008 | Matono et al. |
| 7,612,965 | B2 | 11/2009 | Kurihara et al. |
| 8,031,432 | B2 | 10/2011 | Hsiao et al. |
| 8,286,329 | B1 | 10/2012 | Zhao et al. |
| 8,325,570 | B1 * | 12/2012 | Tanaka ................ G11B 5/314 360/125.31 |
| 8,339,739 | B2 | 12/2012 | Balamane et al. |
| 8,486,286 | B1 | 7/2013 | Gao et al. |

(Continued)

OTHER PUBLICATIONS

U.S. Appl. No. 15/095,888, filed Apr. 11, 2016, Wessel et al.
U.S. Appl. No. 15/344,851, filed Nov. 7, 2016, Wessel et al.
File History for U.S. Appl. No. 15/344,851.

*Primary Examiner* — Tan X Dinh
(74) *Attorney, Agent, or Firm* — Hollingsworth Davis, LLC

(57) ABSTRACT

An apparatus includes an apparatus comprising a slider. The slider comprises a substrate comprising a media-facing surface, a first side surface perpendicular to the media-facing surface, and a second side surface opposite the first side surface. A heat sink layer is formed proximate to and thermally coupled to the first side surface of the substrate. A write transducer comprises a waveguide core that at least partially extends from the top surface to the media-facing surface. The waveguide core is formed proximate to and thermally coupled to the heat sink layer. A read transducer is formed proximate to the write transducer such that the read transducer is closer to a trailing edge of the slider than the write transducer.

20 Claims, 10 Drawing Sheets

(56) References Cited

U.S. PATENT DOCUMENTS

| | | |
|---|---|---|
| 8,687,318 B2 | 4/2014 | Meloche et al. |
| 8,721,902 B1 | 5/2014 | Wang et al. |
| 8,947,986 B1* | 2/2015 | Araki ............ G11B 2005/0021 |
| | | 369/13.33 |
| 9,019,661 B2 | 4/2015 | Rea et al. |
| 9,196,269 B2 | 11/2015 | Cao et al. |
| 9,251,830 B1 | 2/2016 | Duda et al. |
| 2008/0055784 A1 | 3/2008 | Shimazawa et al. |
| 2008/0170319 A1 | 7/2008 | Seigler et al. |
| 2008/0253025 A1 | 10/2008 | Fu et al. |
| 2009/0052078 A1 | 2/2009 | Tanaka et al. |
| 2011/0205860 A1* | 8/2011 | Chou ..................... G11B 5/314 |
| | | 369/13.24 |
| 2011/0216634 A1* | 9/2011 | Chou ..................... G11B 11/00 |
| | | 369/13.24 |
| 2011/0228419 A1* | 9/2011 | Tanaka ................. G11B 5/314 |
| | | 369/13.33 |
| 2011/0228420 A1* | 9/2011 | Hara ..................... G11B 5/314 |
| | | 369/13.33 |
| 2011/0286128 A1* | 11/2011 | Tsutsumi ............... B82Y 20/00 |
| | | 369/13.33 |
| 2011/0317528 A1* | 12/2011 | Miyauchi ............... G02B 5/008 |
| | | 369/13.24 |
| 2012/0008233 A1 | 1/2012 | Hirano et al. |
| 2012/0075965 A1* | 3/2012 | Tanaka ................. G11B 5/1278 |
| | | 369/13.33 |
| 2012/0099407 A1* | 4/2012 | Hipwell ................. G11B 5/105 |
| | | 369/13.32 |
| 2012/0113770 A1* | 5/2012 | Stipe ................... G11B 5/6088 |
| | | 369/13.33 |
| 2013/0091695 A1* | 4/2013 | Shimazawa ............ B82Y 20/00 |
| | | 29/601 |
| 2013/0229730 A1* | 9/2013 | Hirata ................... G11B 5/314 |
| | | 369/13.33 |
| 2017/0243607 A1* | 8/2017 | Sasaki ............ G11B 2005/0021 |
| | | 369/13.33 |

* cited by examiner

SUBSTRATE HEAT CHANNELS FOR HEAT ASSISTED MAGNETIC RECORDING FOR READER OVER WRITER TRANSDUCER APPLICATION

SUMMARY

Various embodiments involve an apparatus comprising a slider. The slider comprises a substrate comprising a media-facing surface, a first side surface perpendicular to the media-facing surface, and a second side surface opposite the first side surface. A heat sink layer is formed proximate to and thermally coupled to the first side surface of the substrate. A write transducer comprises a waveguide core that at least partially extends from the top surface to the media-facing surface. The waveguide core is formed proximate to and thermally coupled to the heat sink layer. A read transducer is formed proximate to the write transducer such that the read transducer is closer to a trailing edge of the slider than the write transducer.

Various embodiments involve an apparatus comprising a slider. The slider comprises a substrate comprising a media-facing surface, a first side surface perpendicular to the media-facing surface, and a second side surface opposite the first side surface. A heat sink layer is formed proximate to and thermally coupled to the substrate. The slider comprises a writer comprising a write pole, a return pole, and a write coil arrangement. A reader is formed proximate to the writer such that the reader is closer to a trailing edge of the slider than the writer. The slider comprises a near-field transducer proximate the write pole. An optical waveguide is formed proximate to and thermally coupled to the heat sink layer, the optical waveguide configured to receive light from a light source.

Various embodiments involve a method comprising energizing at least one component disposed on a slider configured for heat-assisted magnetic recording. The slider has a read transducer formed proximate to the write transducer such that the read transducer is closer to a trailing edge of the read/write head than the write transducer. Heat is conducted away from the at least one component by a heat sink layer and conducted to a substrate of the slider. The heat sink layer is formed proximate to and thermally coupled to the substrate.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Figure 1:
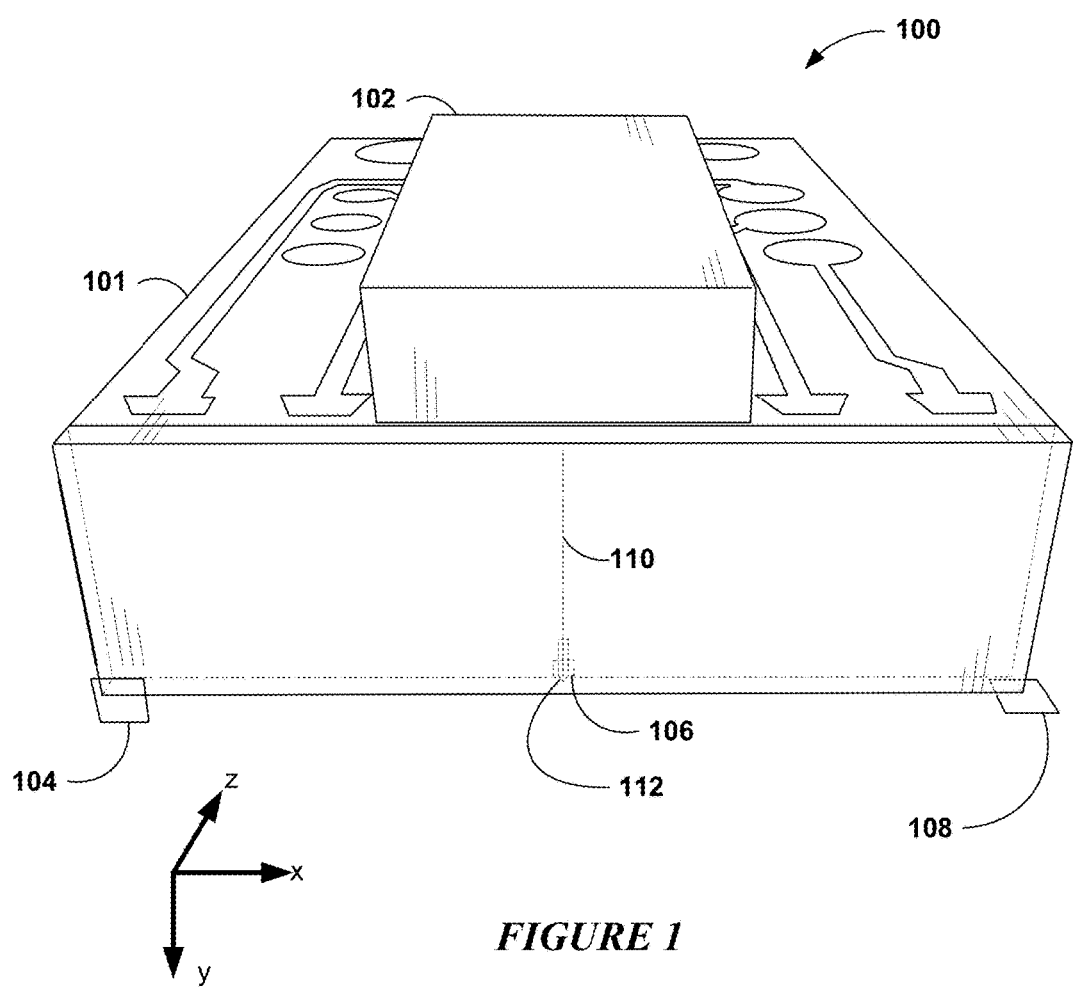
FIG. 1 shows a recording head arrangement in accordance with various embodiments.

In reference to FIG. 1, a perspective view shows a HAMR slider assembly 100 according to an example embodiment. The slider assembly 100 includes a laser diode 102 located on input surface of a slider body 101. In this example, the input surface is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
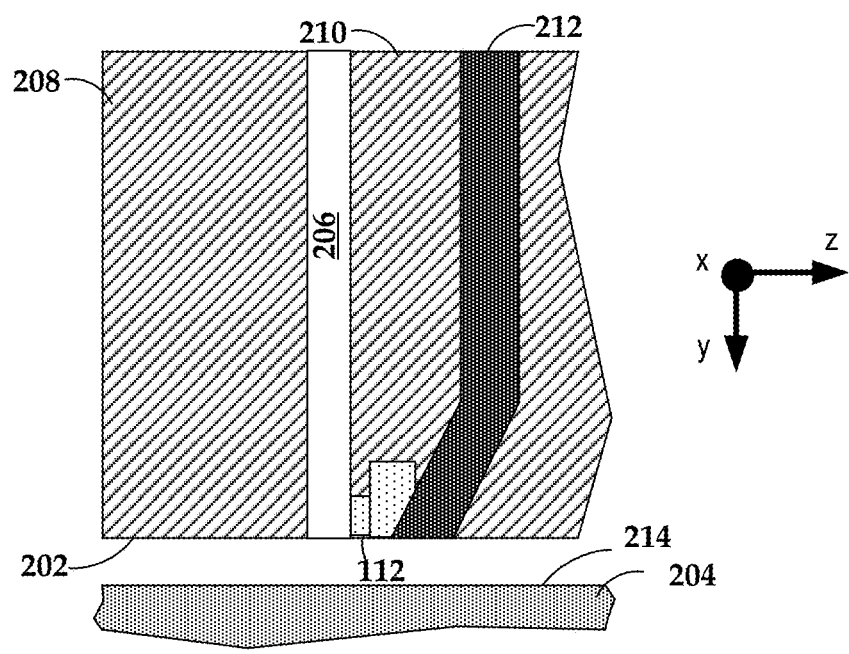
FIG. 2 illustrates a perspective view of a HAMR hard drive slider that may be implemented in accordance with various embodiments of the disclosure.

In reference now to FIG. 2, a cross-sectional view shows details of a HAMR slider according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core is 206 surrounded by cladding layers 208, 210. The waveguide core 206 and cladding layers 208, 210 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, AlO, etc. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the magnetic recording medium 204 placed in close proximity to surface 202 of the apparatus. Further illustrated in FIG. 2 is a recording pole 212 of the read/write head that is located alongside the NFT 112. The recording pole 212 generates a magnetic field (e.g., perpendicular field) used in changing the magnetic orientation of the hotspot during writing.

The slider also includes a reader and a writer (not shown) proximate the media-facing surface 202 for respectively reading and writing data from/to the magnetic recording medium 204. The writer and reader may include corresponding heaters. Each of the heaters is thermally coupled to the slider body and may be a resistive heater that generates heat as electrical current is passed therethrough. The writer heater can be powered to cause protrusion of the ABS predominately in the ABS region at or proximate the writer, and the reader heater can be powered to cause protrusion of the ABS predominately in the ABS region at or proximate the reader. Activation of both the writer and reader heaters causes protrusion of the pole tip region of the slider body which includes both the writer and the reader. Power can be controllably delivered independently to the heaters to adjust the fly height (e.g., clearance) of the slider relative to the surface of the magnetic recording medium 204.

Figure 3:
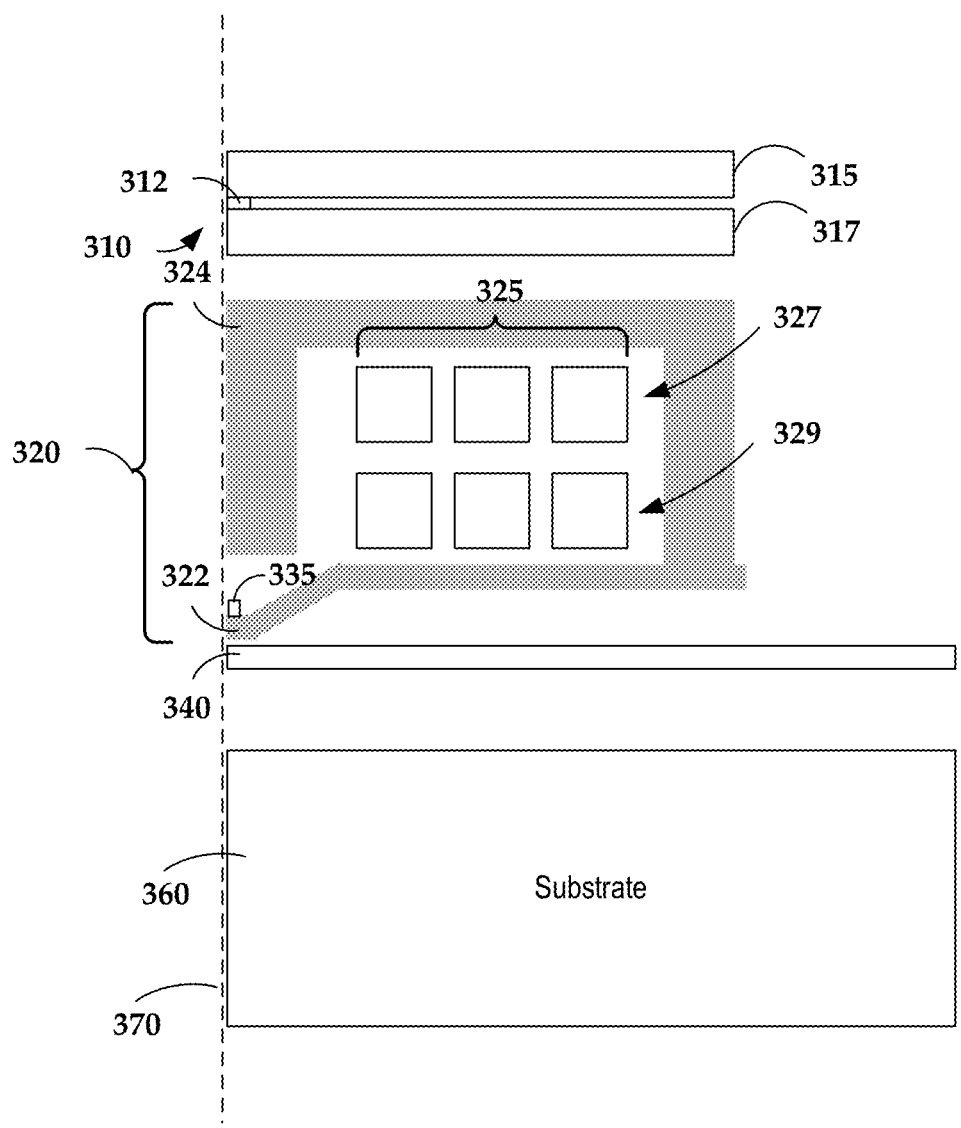
FIG. 3 illustrates a portion of a slider having a reader over writer configuration in accordance with various embodiments described herein.

According to various implementations, the reader is positioned closer to a trailing edge of the slider than the write transducer. This configuration is referred to herein as a "reader over writer" configuration. FIG. 3 illustrates a portion of a slider having a reader over writer configuration in accordance with various embodiments described herein. The portion of the slider shown in FIG. 3 includes a substrate 360 upon which several slider components are situated. The substrate 360 can comprise various materials such as AlTiC, for example. The slider includes in air bearing surface 370, which is indicated by the dashed line. A number of components are shown at or near the ABS 370. The slider includes a reader 310 comprising a reader element 312 disposed between a pair of reader shields 315 and 317. A writer 320 includes a write coil arrangement 325 that, when energized, induces magnetic flux through a write pole 322 and return pole 324.

In some embodiments, the slider is configured for heat-assisted magnetic recording. In other embodiments, the slider is configured for conventional magnetic recording (i.e., not configured for HAMR). In the embodiment illustrated in FIG. 3, the slider is implemented for HAMR and is shown to include an NFT 335 situated proximate the write pole 322 of the writer 320. A heat sink is typically disposed between the NFT 335 and the write pole 322. A HAMR slider may include an optical waveguide 340, such as a planar or channel waveguide, extending through the slider body and optically coupled to the NFT 335 and a light source, such as a laser diode. It is understood that for embodiments not configured for HAMR, the slider would exclude the NFT 335, optical waveguide, and other optical components associated with a HAMR slider configuration.

As described above, the writer 320 is shown to include a write coil arrangement 325. In the embodiment shown in FIG. 3, the write coil arrangement 325 includes an upper layer 327 and a lower layer 329. The write coil arrangement 325 may conform to any writer coil design, including a single-layer pancake design or a helical coil design, for example. The coil arrangement 325 can include a single coil, such as upper coil 327 and exclude the lower coil 329 or vice versa. In other embodiments, the coil arrangement 325 shown in FIG. 3 can have a helical design.

Sliders configured for HAMR may have a high level of write-induced-writer-protrusion due to laser light absorption and writer coil generated heat. As was previously discussed, the slider includes a writer heater and typically a reader heater that are used to control protrusion of the slider at the ABS 370 during write and read operations. In some cases, it may be desirable that slider protrusion at the ABS 370 result substantially only from the activation of the writer and/or reader heaters. However, various components of the slider generate appreciable amounts of heat when energized. The heat produced by the energized slider components contributes to slider protrusion of the ABS 370 at the writer and/or reader. The additional heat sources that contribute to slider protrusion at the ABS 370 complicate various slider operations that rely on precise control of one or both of the writer and reader heaters, such as setting slider clearance, dynamic fly height adjustment, topographical evaluation (e.g., thermal asperity detection), and head-medium contact detection, for example. Using thermal vias and/or at least one heat channel coupled to the substrate according to various embodiments serves to transfer heat from the writer to surrounding materials.

The writer coils, for example, generate considerable heat during writing due to Joule heating, hysteresis loss, and eddy current heating. Embodiments of the disclosure are directed to one or more thermally conductive vias within the slider that transfer writer-generated heat to the slider's ceramic substrate via at least one heat channel. More generally, one or more thermally conductive vias are provided within the body of the slider to transfer heat generated by one or more of the slider's heat generating components directly to the slider's substrate via a heat channel. The substrate serves as a cool and high-capacity thermal reservoir that is able to readily dissipate thermal energy due to exposure to high pressure airflow at the air bearing surface of the slider.

According to various embodiments, the substrate comprises a material that has a high Young's Modulus (natural stiffness) such as AlTiC. A heat channel, also referred to a heat sink layer herein, may be coupled to a waveguide and/or write coils by the thermal vias to assist in transferring the heat to the substrate. The stiffness of the material of the substrate restricts the protrusion of the writer especially in cases in which the writer is closer to the substrate than the reader as illustrated in FIG. 3. A stiff AlTiC substrate may increase the localized heat. The heat channel alleviates the increased heat by conducting heat away from the slider components and into the substrate.

Figure 4:
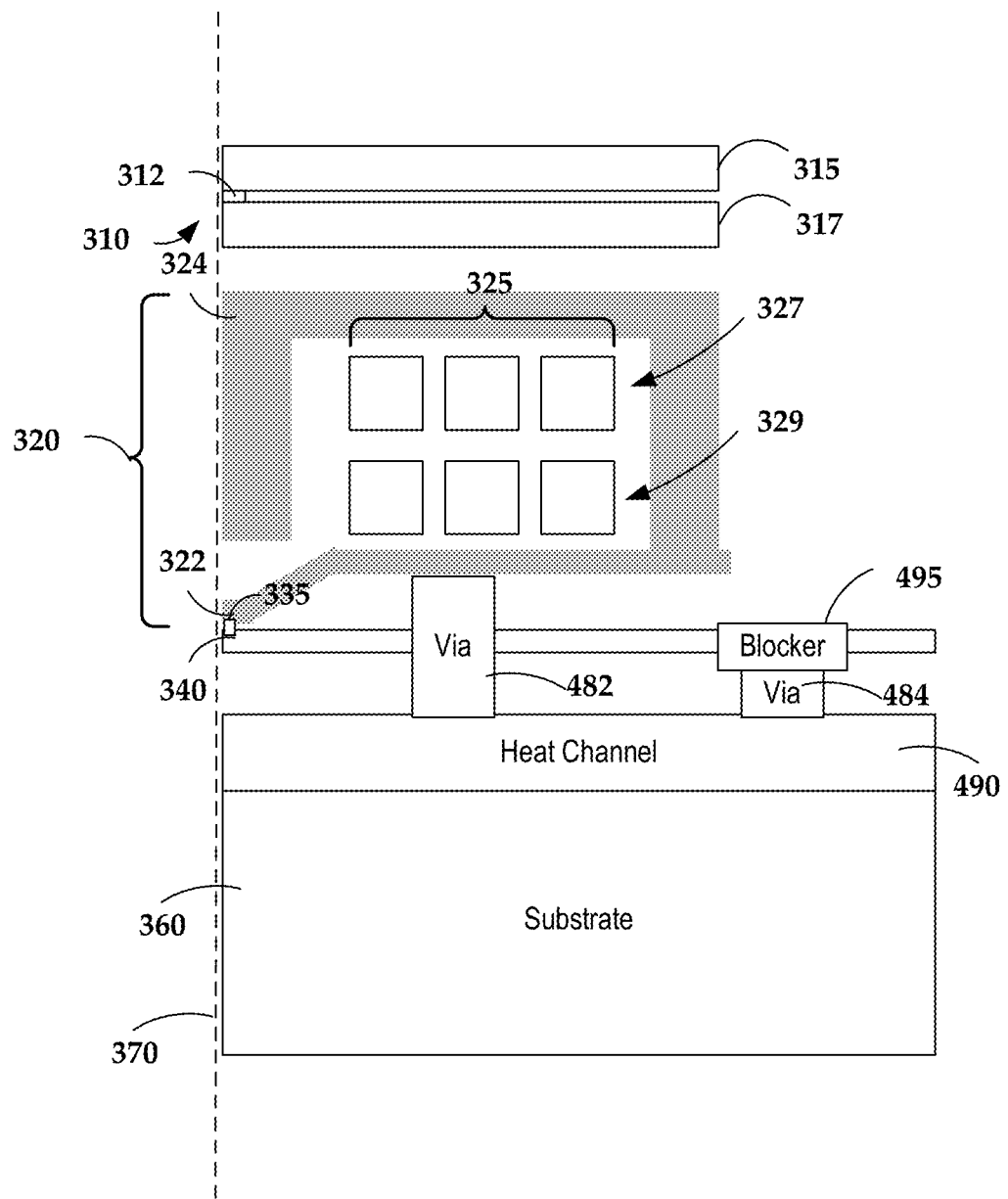
FIG. 4, shows a heat channel layer formed on the substrate according to some implementations.

In FIG. 4, the slider includes a number of thermal vias 482, 484 connected to and extending from the substrate 360 to a location proximate the write coil arrangement 325. The thermal vias 482, 484 are configured to conduct heat away from the write coil arrangement 325 and to the substrate 360. The substrate 360 is a relatively large feature of the slider that, because of its thermal conductivity (e.g., ~20-30 W/mK), can serve as a heat reservoir for conducting heat away from one or more components of the slider that generate heat when energized. According to some embodiments, the thermal vias 582, 584 can be formed from a metal or metal alloy with good conductivity. Suitable metals or metal alloys include those containing Cu, W, Ag, Au, Al, and Ru, for example.

According to various embodiments, a heat channel is used in conjunction with the thermal vias to dissipate heat. FIG. 4 illustrates a slider having a heat channel 490 located between the write coil arrangement 325 and the substrate 460. In FIG. 4, the heat channel extends to the media-facing surface. According to various embodiments, the heat channel 490 is a high thermal conductivity sheet film comprising Cu and/or Au, for example. The heat channel 490 may be deposited in direct contact with the substrate surface. The heat channel 490 may have the effect of improving the thermal conductivity of the substrate 360 by covering a portion and/or the entire substrate surface underneath the read/write transducer. The heat channel 490 may also provide multiple thermal pathway points to allow heat formed within the read/write transducer to permeate more evenly. A waveguide blocker 495 may be used to prevent stray light from reaching the writer 320 by reflecting and/or absorbing the light.

According to various implementations, the heat channel 490 is a film and may be the only material placed between the substrate and the read/write transducer itself. In this case, the heat channel 490 provides an efficient pathway to conduct heat away from the read/write transducer and into the surrounding materials. Because the heat channel 490 has a high thermal conductivity, the material may also have a low Young's modulus. Applying a thin heat channel material having a low Young's modulus would have limited impact on a system having a substrate with a high Young's Modulus such as AlTiC. In some cases, the heat channel 490 has a thickness in the range of about 0.25-1.75 μm, e.g., 1 μm. The heat channel 490 may be formed as a sheet film that substantially covers the entire substrate surface or may cover only a portion of the substrate surface.

Figure 5A:
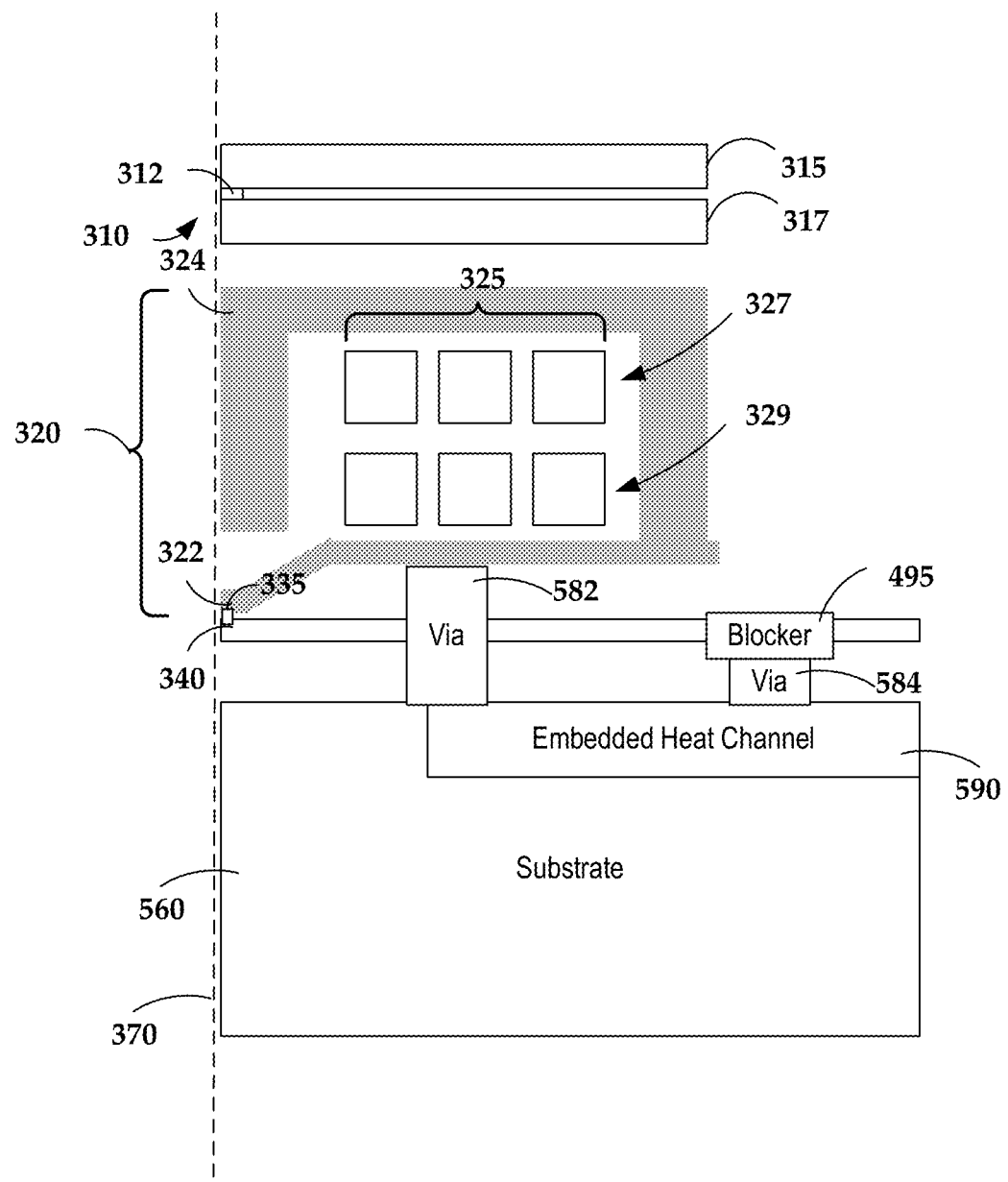
FIGS. 5A-5E illustrate examples in which the heat channel is embedded in the substrate according to various aspects.
Figure 5B:
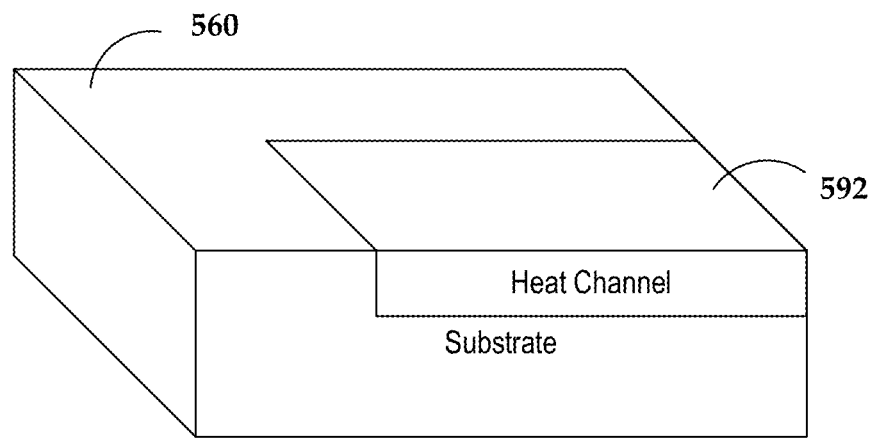
Figure 5C:
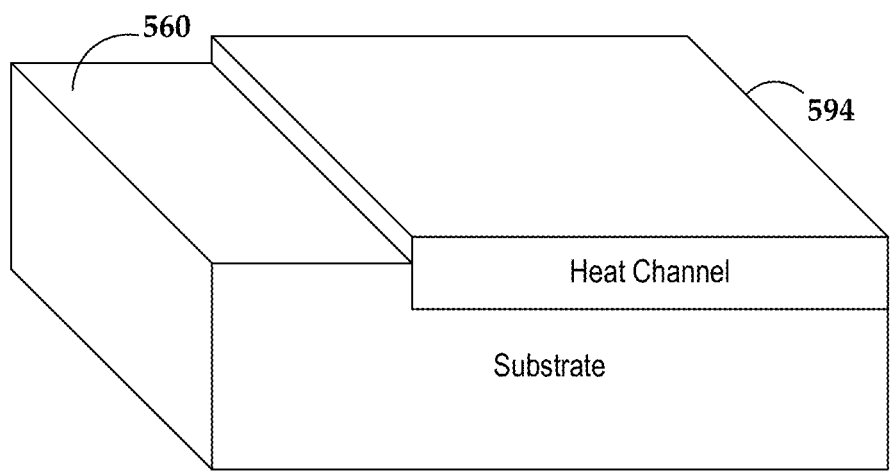
Figure 5D:
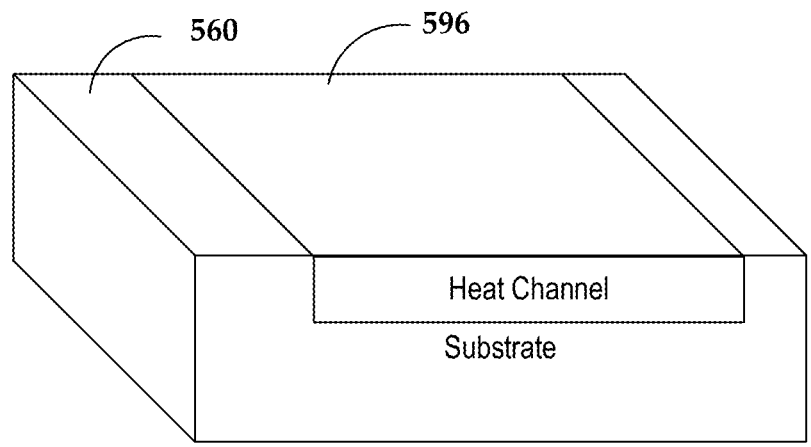
Figure 5E:
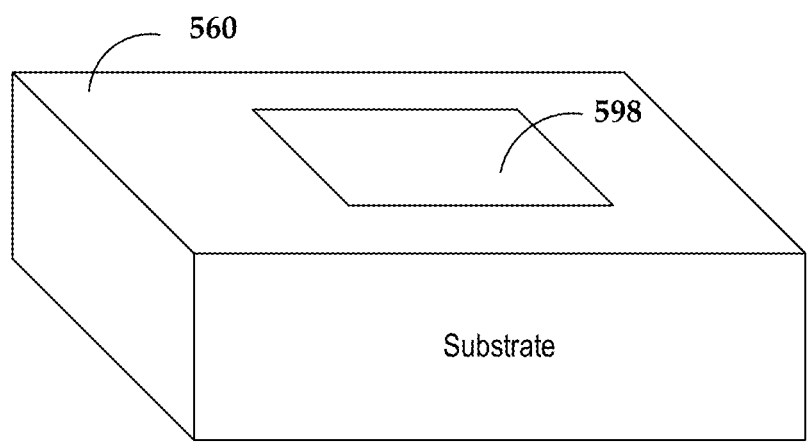

While FIG. 4 illustrates examples where the heat channel is a film on the surface of the substrate, in some cases, the heat channel may be partially or entirely embedded in the substrate. FIGS. 5A-5E illustrate examples in which the heat channel 590 is embedded in the substrate. Similarly to FIG. 4, FIG. 5A includes a number of thermal vias 482, 484 connected to and extending from the substrate 560 to a location proximate the write coil arrangement 325. A heat channel 590 is used in conjunction with the thermal vias 582, 584 to dissipate heat. The heat channel 590 of FIG. 5A is at least partially embedded in the substrate 560. According to various implementations, the heat channel is recessed from the media-facing surface as shown in FIGS. 5A-5E. Embedding the heat channel 590 in the substrate can increase heat transfer between the substrate 560 and the heat channel 590 because of the increased surface area contact of the heat channel 590 with the substrate 560. FIGS. 5B-5E illustrate different heat channel configurations. FIG. 5B shows an example in which the heat channel 592 is embedded in the substrate and only extends a portion of the length of the substrate 560. As described previously, the heat channel 594 may only be partially embedded in the substrate 560 as shown in FIG. 5C. FIGS. 5D and 5E illustrate embodiments in which the embedded heat channel 596, 598 is located in different positions in the substrate 560.

Figure 6A:
FIGS. 6A-6D show cross sections of patterned heat channels in accordance with some implementations.
Figure 6B:
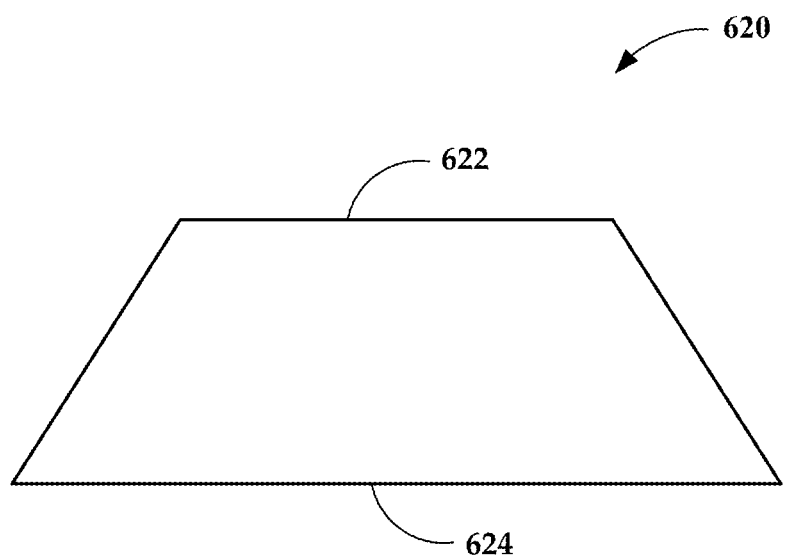

In some cases, the heat channels of FIGS. 4 and/or 5A-5E is patterned. For example, a heat channel may be patterned to direct heat into particular locations. FIGS. 6A-6D show cross sections of patterned heat channels. The cross section of the heat channel may have a rectangular or a square shape in some cases. The heat channel of FIG. 6A shows a heat channel 610 having a rectangular shape. In some cases, the cross section of the heat channel 620 has a trapezoidal shape as shown in FIG. 6B. The trapezoidal heat channel 620 may be any configuration. For example, the shorter side 622 of the trapezoidal heat channel may face the waveguide core and the longer side 624 may face the substrate. In some cases, the longer side 624 faces the waveguide core and the shorter side 622 faces the substrate.

Figure 6C:
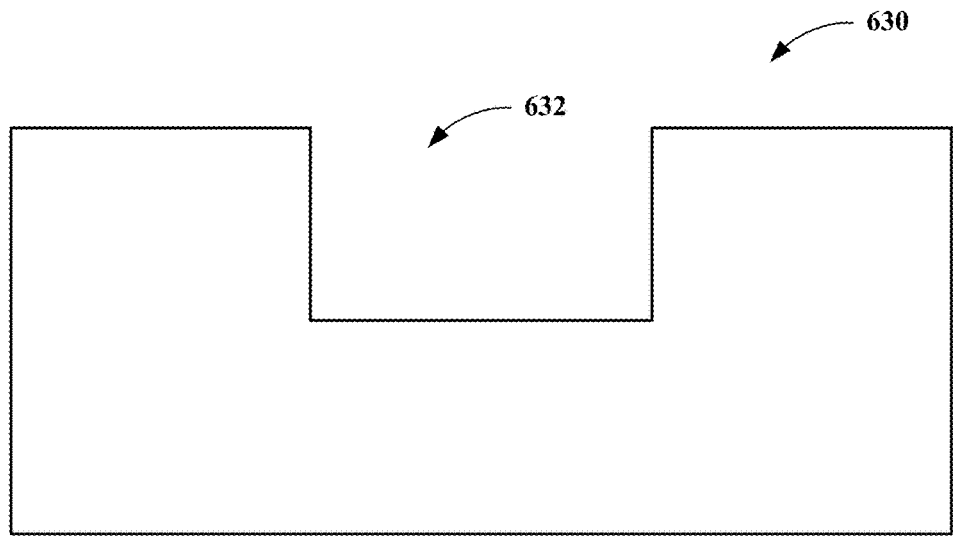
Figure 6D:
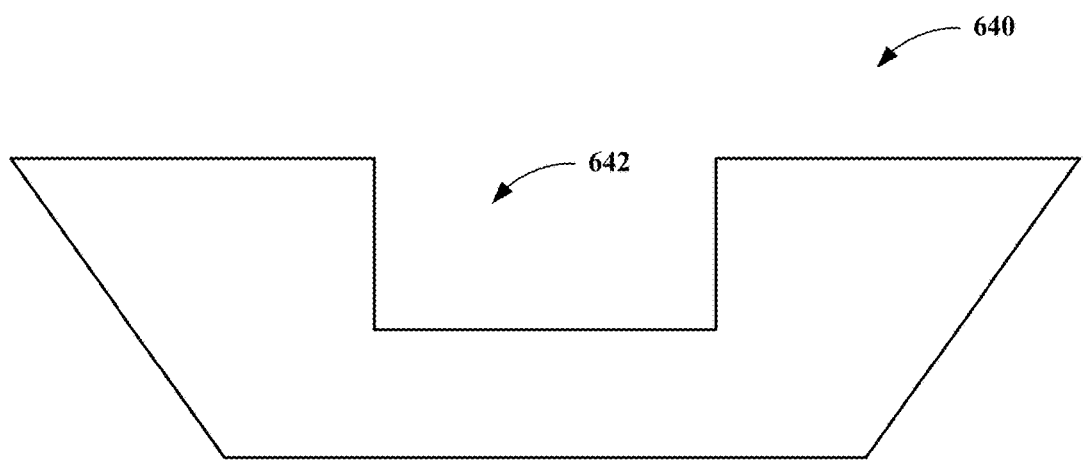

In some cases, the heat channel may have a cut-out portion as shown in FIGS. 6C and 6D. The cut-out portion of the heat channel may conduct the heat away from components of the slider while limiting any excess protrusion of the slider. FIG. 6C illustrates an embodiment in which the cross section of a rectangular heat channel 630 has a cut-out portion 632. The cut-out portion 632 may be on the side of the heat channel 630 that faces the waveguide core. In some cases, the cut-out portion 632 is on a side of the heat channel 630 that faces the substrate. FIG. 6D illustrates an embodiment in which a cross section of the heat channel 640 has a trapezoidal shape having a cut-out portion 642. The cut-out portion 642 may be on a side of the heat channel 640 that faces the waveguide core. In some cases, the cut-out portion 642 is on a side of the heat channel 640 that faces the substrate. In some cases, the cut-out portion of the heat channel is filled with some other material such as the material of the substrate, for example.

Figure 7:
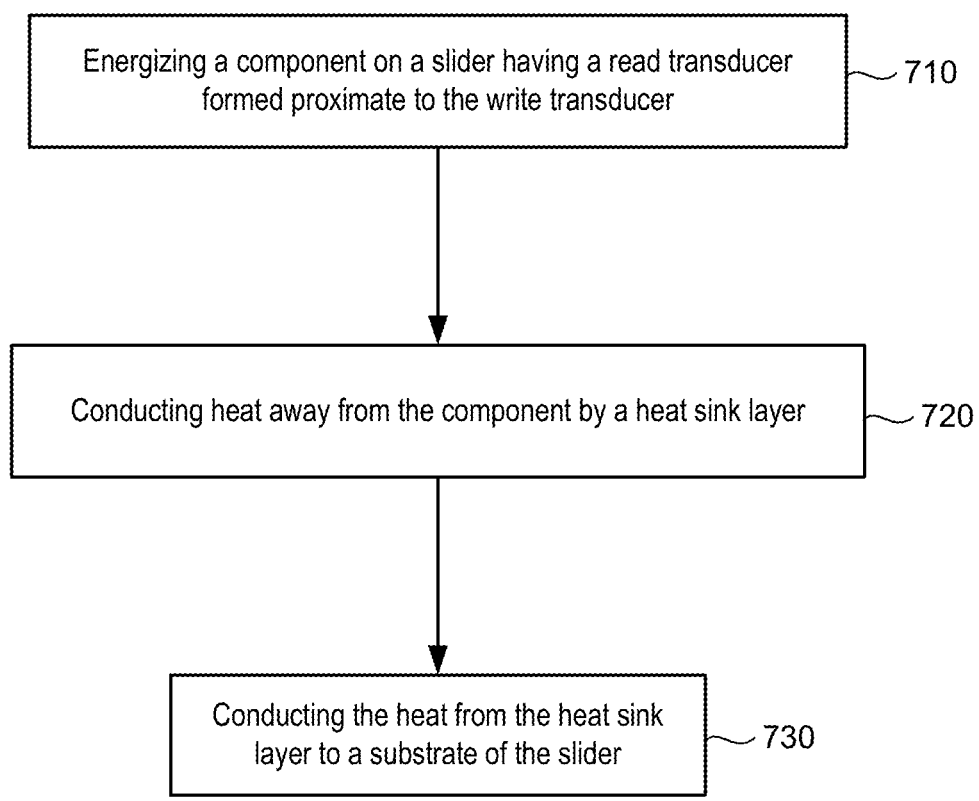
FIG. 7 shows a flow diagram of a method for cooling a component of a slider that generates heat when energized in accordance with various embodiments described herein.

Turning now to FIG. 7, there is illustrated a flow diagram of a method for cooling a component of a slider that generates heat when energized in accordance with various embodiments. The method shown in FIG. 7 involves energizing 710 at least one component disposed on a slider configured for heat-assisted magnetic recording. The component may be one or more of a reader, a writer core, a return pole of a writer, and at least one coil of a coil arrangement, for example. According to various embodiments, the slider has a read transducer formed proximate to the write transducer such that the read transducer is closer to a trailing edge of the read/write head than the write transducer. The method also involves conducting 720 heat away from the at least one component by a heat sink layer. In some cases, the heat sink layer is formed proximate to and thermally coupled to the substrate. The heat sink layer may be thermally coupled to the waveguide core by thermal vias extending therebetween. In some cases, the substrate comprises a top surface and a media facing surface opposite the top surface. The heat sink layer may be recessed from the media facing surface and/or may extend to the media-facing surface. The method further involves conducting 730 the heat from the heat sink layer to a substrate of the slider. In some embodiments, the slider is a conventional slider. In other embodiments, the slider is configured for heat-assisted magnetic recording.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a slider, comprising:
      a substrate comprising a media-facing surface, a first side surface perpendicular to the media-facing surface, and a second side surface opposite the first side surface;
      a heat sink layer formed proximate to and mechanically coupled to the first side surface of the substrate;
      a write transducer comprising a waveguide core that at least partially extends from the top surface to the media-facing surface, the waveguide core formed proximate to and thermally coupled to the heat sink layer, the heat sink layer disposed between the substrate and the write transducer and configured to transfer heat away from the write transducer; and
      a read transducer formed proximate to the write transducer such that the read transducer is closer to a trailing edge of the slider than the write transducer.

2. The apparatus of claim 1, wherein the heat sink layer is thermally coupled to the waveguide core by thermal vias extending therebetween.

3. The apparatus of claim 1, wherein the heat sink layer is recessed from the media-facing surface.

4. The apparatus of claim 1, wherein the heat sink layer extends to the media-facing surface.

5. The apparatus of claim 1, wherein the substrate comprises AlTiC.

6. The apparatus of claim 1, wherein the heat sink layer is at least partially embedded in the substrate.

7. The apparatus of claim 1, wherein the heat sink layer is patterned.

8. The apparatus of claim 1, wherein the heat sink layer has a thickness of about 0.25-1.75 µm.

9. An apparatus, comprising:
   a slider, comprising:
      a substrate comprising a media-facing surface, a first side surface perpendicular to the media-facing surface, and a second side surface opposite the first side surface;
      a heat sink layer formed proximate to and mechanically coupled to the first side surface of the substrate;
      a writer comprising a write pole, a return pole, and a write coil arrangement, the heat sink layer disposed between the substrate and the writer and configured to transfer heat away from the writer;
      a reader formed proximate to the writer such that the reader is closer to a trailing edge of the slider than the writer;
      a near-field transducer proximate the write pole; and
      an optical waveguide formed proximate to and thermally coupled to the heat sink layer, the optical waveguide configured to receive light from a light source.

10. The apparatus of claim 9, wherein the heat sink layer is thermally coupled to the waveguide core by thermal vias extending therebetween.

11. The apparatus of claim 9, wherein the heat sink layer is recessed from the media-facing surface.

12. The apparatus of claim 9, wherein the heat sink layer extends to the media-facing surface.

13. The apparatus of claim 9, wherein the substrate comprises AlTiC.

14. The apparatus of claim 9, wherein the heat sink layer is at least partially embedded in the substrate.

15. The apparatus of claim 9, wherein the heat sink layer is patterned.

16. A method, comprising:
  energizing at least one component disposed on a slider configured for heat-assisted magnetic recording, the slider having a read transducer formed proximate to a write transducer such that the read transducer is closer to a trailing edge of the slider than the write transducer, the slider comprising a substrate having a media-facing surface, a top surface opposite the media-facing surface, a first side surface perpendicular to the media-facing surface, and a second side surface opposite the first side surface;
  conducting heat away from the write transducer by a heat sink layer, the heat sink layer formed between the first side surface of the substrate and the write transducer and mechanically coupled to the substrate; and
  conducting the heat from the heat sink layer to the substrate of the slider.

17. The method of claim 16, wherein the component comprises one or more of a reader, a writer core, a return pole of a writer, and at least one coil of a coil arrangement.

18. The method of claim 16, wherein the heat sink layer is thermally coupled to the waveguide core by thermal vias extending therebetween.

19. The method of claim 16, wherein the heat sink layer is recessed from the media-facing surface.

20. The method of claim 16, wherein the heat sink layer extends to the media-facing surface.

\* \* \* \* \*